(12) United States Patent
Ootori et al.

(10) Patent No.: US 6,468,158 B1
(45) Date of Patent: *Oct. 22, 2002

(54) TACTILE-FORCE GENERATING APPARATUS

(75) Inventors: Yasuhiro Ootori; Hiroki Ogata, both of Tokyo (JP)

(73) Assignee: Sony Computer Entertainment Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/472,333

(22) Filed: Dec. 27, 1999

(30) Foreign Application Priority Data

Dec. 28, 1998 (JP) .......................... 10-372337

(51) Int. Cl.[7] ................................. A63F 13/02
(52) U.S. Cl. ................. 463/38; 463/37; 273/148 B
(58) Field of Search .............................. 463/36, 37, 38, 463/39; 345/161; 273/148 B, 456

(56) References Cited

U.S. PATENT DOCUMENTS

| 4,489,303 A | | 12/1984 | Martin | |
| 4,500,867 A | * | 2/1985 | Ishitobi et al. ............... 338/128 |
| 5,160,918 A | * | 11/1992 | Saposnik et al. ........... 340/709 |
| 5,532,476 A | * | 7/1996 | Mikan ........................ 250/221 |
| 5,559,432 A | * | 9/1996 | Logue ................... 324/207.17 |
| 5,738,352 A | | 4/1998 | Ohkubo et al. | |
| 5,759,100 A | | 6/1998 | Nakanishi | |
| 5,785,317 A | | 7/1998 | Sasaki | |
| 5,831,596 A | * | 11/1998 | Marshall et al. ............ 345/161 |
| 5,889,670 A | | 3/1999 | Schuler et al. | |
| 5,889,672 A | | 3/1999 | Schuler et al. | |
| 5,929,846 A | * | 7/1999 | Rosenberg et al. ......... 345/161 |
| 5,982,354 A | * | 11/1999 | Arita et al. ................. 345/158 |
| 6,001,014 A | | 12/1999 | Ogata et al. | |

* cited by examiner

Primary Examiner—Valencia Martin-Wallace
Assistant Examiner—Julie Brocketti
(74) Attorney, Agent, or Firm—Katten Muchin Zavis Rosenman

(57) ABSTRACT

In order to reduce the number of parts and to provide sufficient direct tactile sensation transmitted to the finger tip, there is provided a tactile-force generating apparatus for generating in an input section which can be displaced from a predetermined position of an input unit for inputting information to a game machine main unit a tactile force for returning to the predetermined position, the tactile-force generating apparatus including: a coil spring for generating a tactile force independently of game information in a control pad; and a permanent magnet and an electromagnet for generating a tactile force corresponding to the game information in the control pad.

22 Claims, 20 Drawing Sheets

TACTILE-FORCE GENERATING APPARATUS

BACKGROUND OF THE INVENTION

1. Field of the Invention

The present invention relates to a tactile-force generating apparatus for changing the magnitude or attributes of a tactile force of an input section, etc., according to or corresponding to game content (information), such as the type of, or the situation in, a game.

2. Description of the Related Art

Hitherto, input sections, such as buttons, levers or the like, of an operation apparatus for home game machines, for example, are urged so as to return to predetermined states by elastic bodies, such as springs, provided therein, and when an input section is operated, such spring is deformed according to the displacement of the input section, and the input section receives a tactile force by the spring's force.

In such a construction, when a game is played by operating an operation button, etc., to instruct the operation of an operation target on a monitor screen, tactile sensations can be perceived only by seeing (visual) a character on the monitor screen or by hearing (audio) sound generated from the monitor. In a conventional operation apparatus, which is usually operated by moving both hands and an arm in various ways, since only a function for instructing one direction by operating with a finger is used substantially, the operation apparatus itself does not provide a tactile sensation feedback function.

Accordingly, a tactile-force generating apparatus has been developed in which when a specific operation or scene is encountered by a game of a certain type or by the operation of the input section, the tactile sensation fed back from the main unit of the game machine can be obtained from the input section itself so as to improve the verisimilitude of the game, and playing effects are thereby improved. In other words, a specific tactile sensation corresponding to the play of the game is experienced or felt by the operator directly at the location the input section, or button or the like.

For example, in an apparatus shown in FIG. 1, a rotational force generated by a motor 1, etc., is decreased/amplified by a deceleration mechanism 6 comprising a gear 2, a gear 3, a pinion 4, a rack 5, etc., is converted into linear movement by a link mechanism 7, and is transmitted to an input section such as a lever 8, etc. In addition, a cushioning member 10, such as a spring 9, is interposed between the deceleration mechanism 6 and the link mechanism 7 so that this cushioning member 10 prevents excessive force from being applied to each component.

In an apparatus shown in FIG. 2, a rotational force generated by a motor 11, etc., is transmitted to an input section, such as a lever 20, via a deceleration mechanism 16 comprising a worm 12, a worm wheel 13, a pinion 14, a rack 15, etc., a cushioning member 18, such as a spring 17, and a link mechanism 19, so that a tactile force of the input section is prevented from being transmitted to the motor 11 by the rack 15 and the pinion 14.

In these apparatuses, the amounts of compression of the springs 9 and 17 are varied according to the game information by driving the motors 1 and 11, causing the tactile forces of the levers 8 and 20 to be varied.

However, in both apparatus, since the deceleration mechanisms 6 and 16 are provided, the number of parts is large, and this is disadvantageous in terms of reliability and cost. Also, since several mechanisms are interposed between the input section and the motors 1 and 11, there is play due to backlash, and there is a tendency for tactile sensations transmitted to the finger tip to lack direct sensation.

SUMMARY OF THE INVENTION

The present invention has been achieved to overcome the above-described problems. An object of the present invention is to provide a tactile-force generating apparatus which is capable of operating efficiently in a relatively small amount of space and which is capable of providing sufficient and significant direct tactile sensation transmitted to the finger tip.

To achieve the above-mentioned object, according to the present invention, there is provided a tactile-force generating apparatus for generating in an input section which can be displaced from a predetermined position of an input unit for inputting information into a game machine main unit or the like, a tactile-force for returning said input section to said predetermined position, the tactile-force generating apparatus comprising: a first tactile-force generation unit for generating in the input section a tactile force independently of game information; and a second tactile-force generation unit for generating in the input section a tactile force corresponding to game information.

The second tactile-force generation unit preferably comprises a magnetic-force generation unit for generating a magnetic force corresponding to game information, and a movable body which receives a repulsion force or an attraction force of a magnetic force generated by the magnetic-force generation unit. The magnetic-force generation unit preferably comprises an electromagnet, and a current supply unit for supplying electric current, corresponding to game information, to the electromagnet. The movable body is preferably a permanent magnet or a magnetic body. The term "permanent" magnet will be understood to reference a magnet that does not change polarity, unlike an electromagnet, for example, which can change polarity depending on the nature of the current supplied thereto. The magnetic-force generation unit comprises a coil, a core and a current supply unit for supplying electric current corresponding to game information to the coil, and the movable body is preferably a magnetic body.

The magnetic-force generation unit may be provided on the side adjacent to the input section, and the movable body may be provided on the side adjacent to the main unit of the input unit. Alternatively, the magnetic-force generation unit may be provided on the side adjacent to the main unit of the input unit, and the movable body may be provided on the side adjacent to the input section.

The input section may also comprise a housing section of the magnetic-force generation unit or the movable body, and the first tactile-force generation unit, the magnetic-force generation unit, and the movable body may be arranged coaxially.

The first tactile-force generation unit comprises a specific tactile-force imparting unit for imparting a specific tactile force to the input section. The specific tactile-force imparting unit comprises a tactile-force-corresponding-to-displacement imparting unit for imparting a tactile force corresponding to the displacement of the input section. The tactile-force-corresponding-to-displacement imparting unit is an elastic body such as a spring or a rubber-like member.

The elastic body may comprise a first elastic body for generating a tactile force at a first displacement of the input section and a second elastic body for generating a tactile force at a second displacement of the input section.

With this construction, a predetermined tactile force which is not related to game information is imparted to the input section by the first tactile-force generation unit, and furthermore, a tactile force corresponding to game information is imparted thereto in such a manner as to be superposed by the second tactile-force generation unit.

The first and second tactile-force generation units may act independently of each other, or in concert as will be explained below in detail. If the second tactile-force generation unit does not contribute to the tactile sensation at the input section, in response to a lack of corresponding game information, for example, the tactile sensation felt at the input section will be governed or dictated solely by the first tactile-force generation unit. However, if game information activates the second tactile-force generation unit, causing such unit to contribute an additive force to the first tactile-force generation unit, then the tactile sensation experienced at the input section will be enhanced or increased as compared with the tactile sensation experienced by the first tactile-force generation unit alone. On the other hand, if game information causes the second tactile-force generation unit to contribute a reducing force to the first tactile-force generation unit, then the tactile sensation experienced at the input section will be decreased as compared with the tactile sensation experienced by the first tactile-force generation unit alone. Consequently, the tactile sensation experienced at the input section can vary greatly depending on game information and the interaction between the first and second tactile-force generation units.

The above and further objects, aspects and novel features of the invention will become more apparent from the following detailed description when read in conjunction with the accompanying drawings.

DESCRIPTION OF THE PREFERRED EMBODIMENTS

A game machine using a tactile-force generating apparatus according to a first embodiment of the present invention will be described below with reference to FIGS. 3 to 10.

Figure 1:
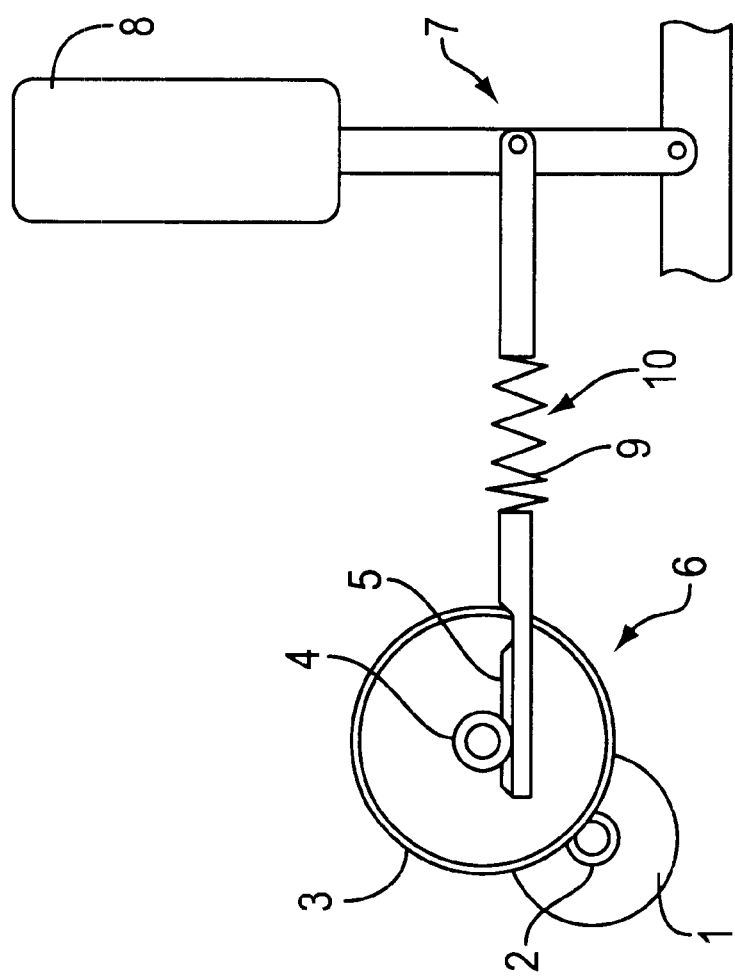
FIG. 1 is a view showing a conventional tactile-force generating apparatus.
Figure 2:
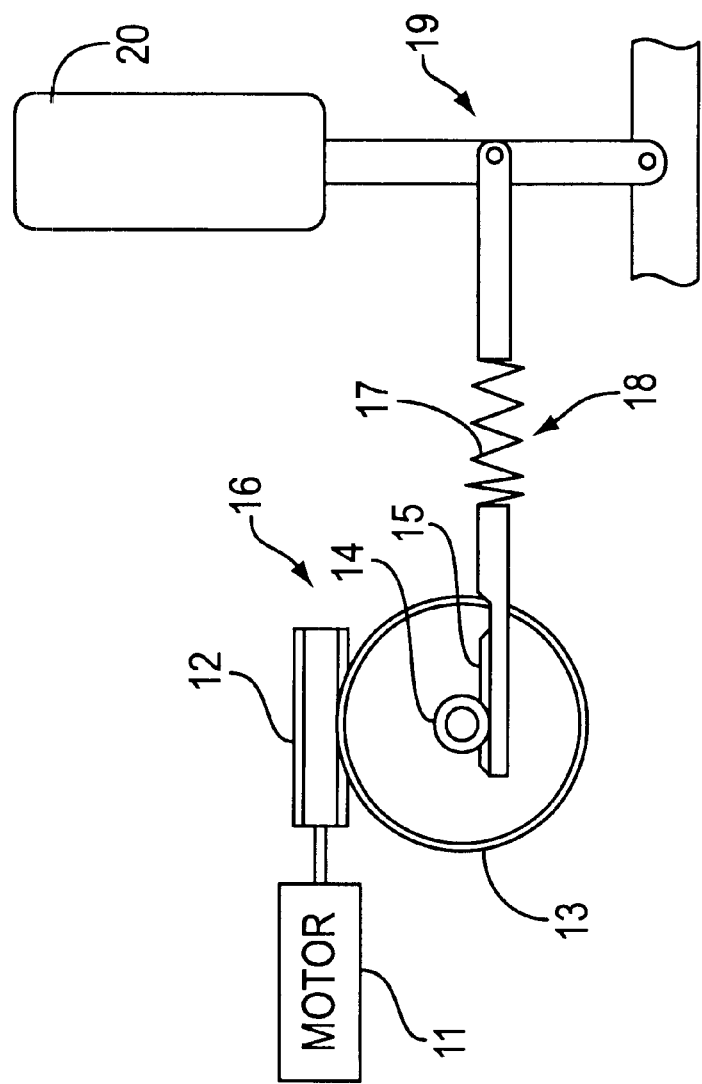
FIG. 2 is a view showing another conventional tactile-force generating apparatus.
Figure 3:
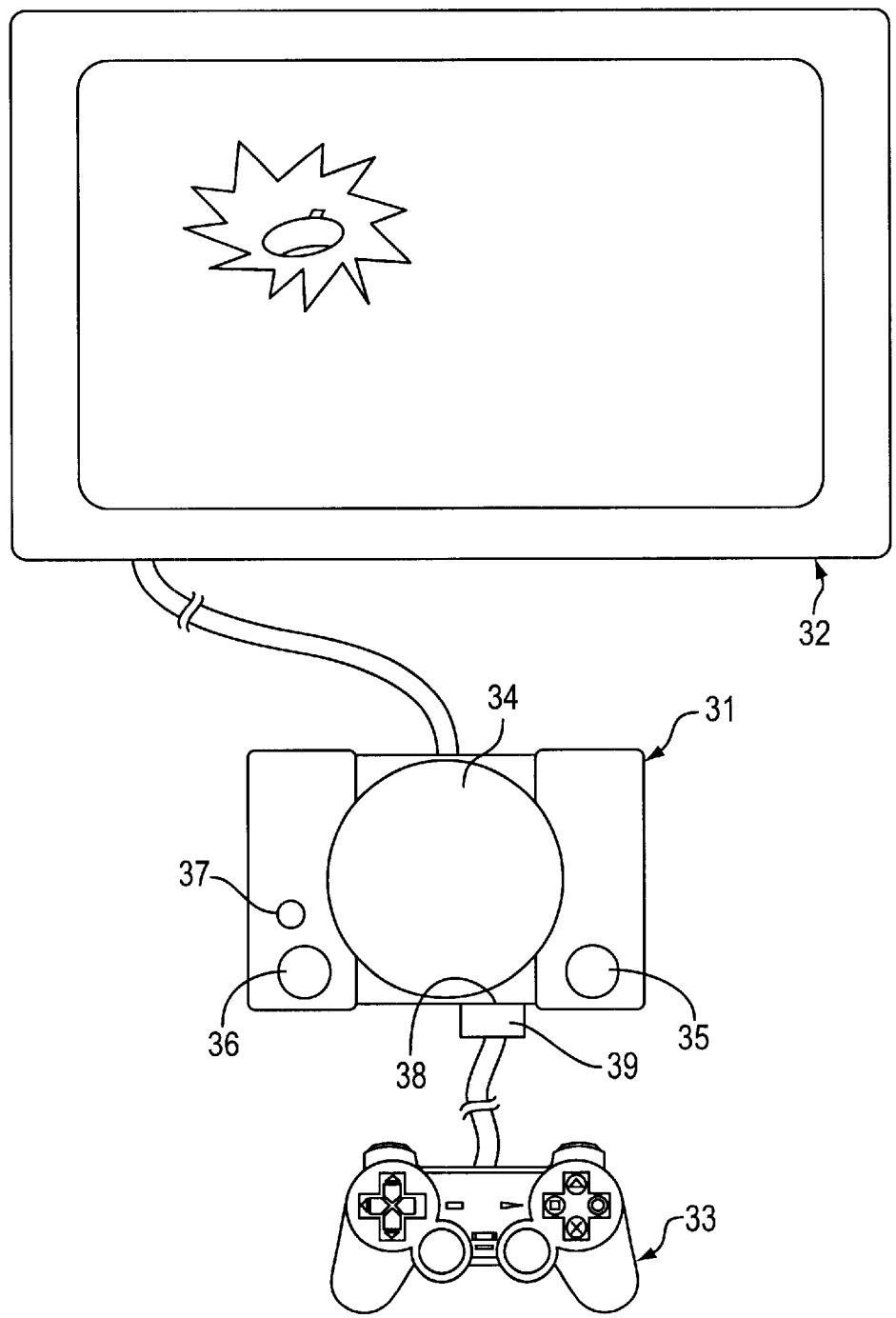
FIG. 3 is a schematic view showing a game machine according to a first embodiment of the present invention.

Referring to FIG. 3, reference numeral 31 denotes a main unit of a game machine. This game machine main unit 31 is connected to a monitor 32, such as a television receiver, and an operation apparatus (input means) 33 for the game machine.

The game machine main unit 31 is formed with a CD-ROM drive unit contained therein having a function for playing back CD-ROMs, which are video recording media, and the top surface of the game machine main unit 31 is provided with a cover member 34 for housing a CD-ROM and for covering it; an opening/closing switch 35 for opening/closing the cover member 34; a power switch 36 for supplying power; a reset switch 37 for resetting the operation of the game machine main unit 31; and a connection section 38 for connecting operation apparatuses of two systems. As a result of connecting a connector 39 of the operation apparatus 33 for the game machine to the connection section 38, two-way communication with the game machine main unit 31 becomes possible.

Figure 4:
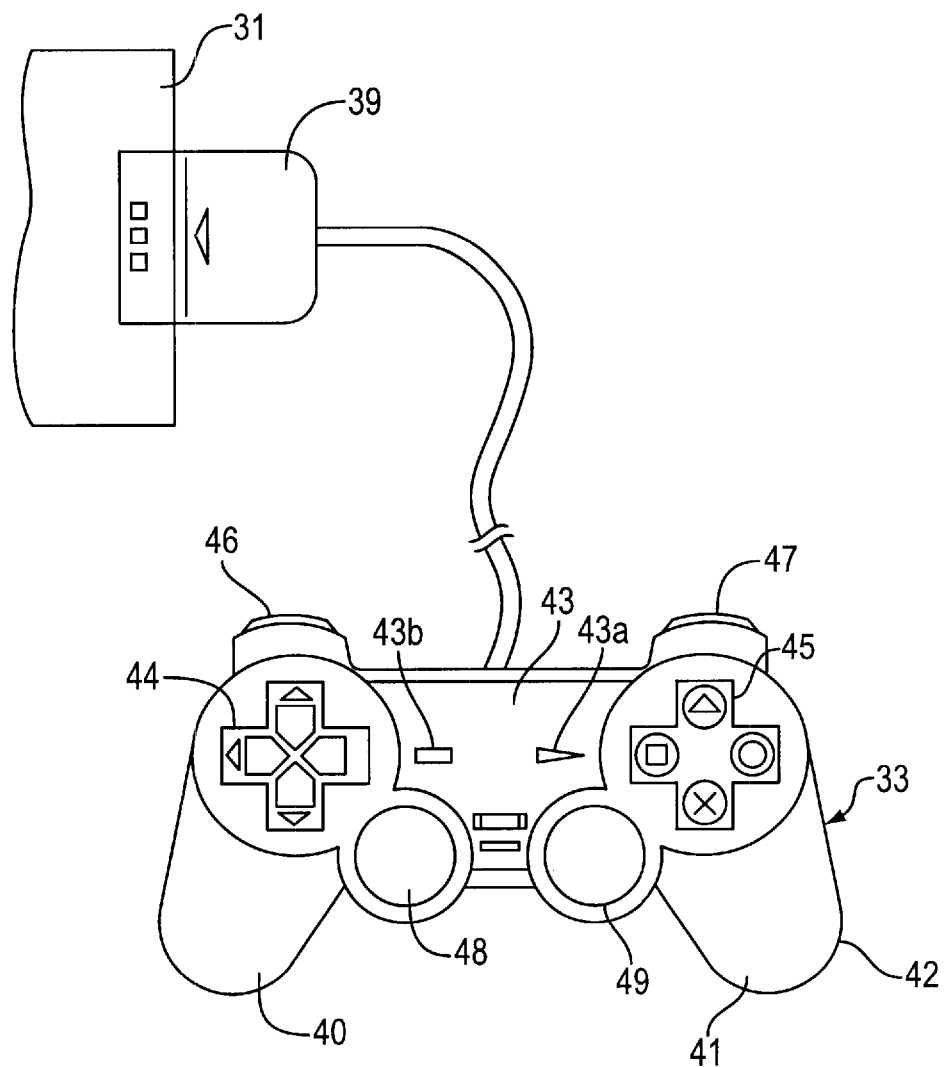
FIG. 4 is a view showing an operation apparatus of the game machine.

As shown in FIG. 4, the operation apparatus 33 for the game machine comprises a housing main unit 42 having first and second operation support sections 40 and 41 projecting in a horn shape, formed in a shape similar to eyeglasses, which are gripped and supported by the palms of both hands, on both sides in a direction along the length of the housing main unit 42; a start select section 43 formed in such a way that a button used to start (43a), select (43b), etc., a game projects from the inside toward the outside at a position at the center of the housing main unit 42 and in an enclosed portion; first and second operation sections 44 and 45 such that buttons project from the inside toward the outside at the top portions on both sides in a direction along the length of the housing main unit 42; third and fourth operation sections 46 and 47 having a button which projects from the inside toward the outside at the wall surface on the front side on both sides in a direction along the length of the housing main unit 42; first and second control pads (input sections) 48 and 49 which are provided in such a manner as to project from the inside toward the outside in the vicinity of the first and second operation sections 44 and 45, respectively; a board for managing communication between a group of switches (not shown) which are mounted inside the housing main unit 42 and the game machine main unit 31 for housing a CD-ROM, which is a video recording medium (not shown), and for playing it back; the connector 39 having a cable for electrically connecting the game machine main unit 31; and a tactile-force generating apparatus 50 (to be described later) placed in a predetermined space inside the housing main unit 42.

Figure 5:
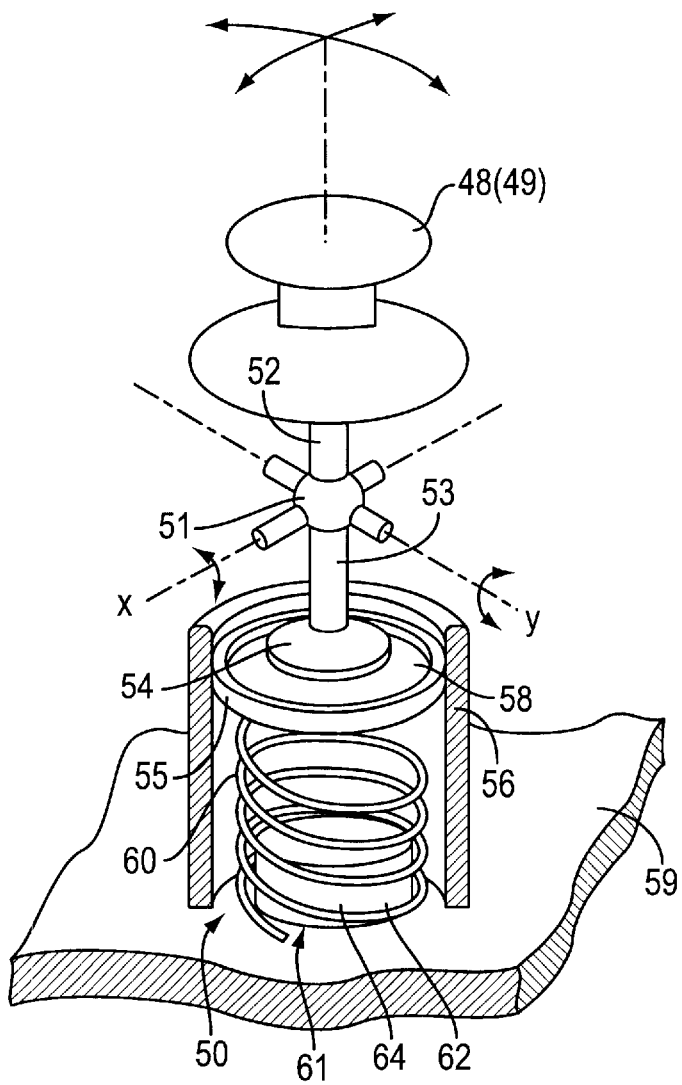
FIG. 5 is a perspective view showing a tactile-force generating apparatus for a control pad of the operation apparatus.

As shown in FIG. 5, the control pad 48 (49) is formed such that a game operation can be performed by turning it in x and y directions about a joint section 51. That is, the joint section 51 is tiltably supported in x and y directions by a joint support mechanism (not shown). Also, the control pad 48 (49) and the joint section 51 are coupled to each other by a first rod 52, and a second rod 53 is extendedly provided from the joint section 51 in a direction opposite to the first rod 52, with a disk-shaped driving body 54 mounted at the tip of the second rod 53. The driving body 54 is positioned adjacent a driving body receiver 55, and the driving body receiver 55 is displaceably guided in the direction of the cylindrical axis by a cylindrical guide 56. Also, the driving body receiver 55 is preferably formed in the shape of a disk so that both surfaces of the receiver are recessed, and a tactile-force generating apparatus 50 is placed on the side adjacent to a first recess 57 (shown in FIG. 6) of the driving body receiver 55. Then, a second recess 58 is brought into abutment with the driving body 54 as a result of being urged toward the driving body 54 by a tactile force generated by the tactile-force generating apparatus 50.

Figure 6:
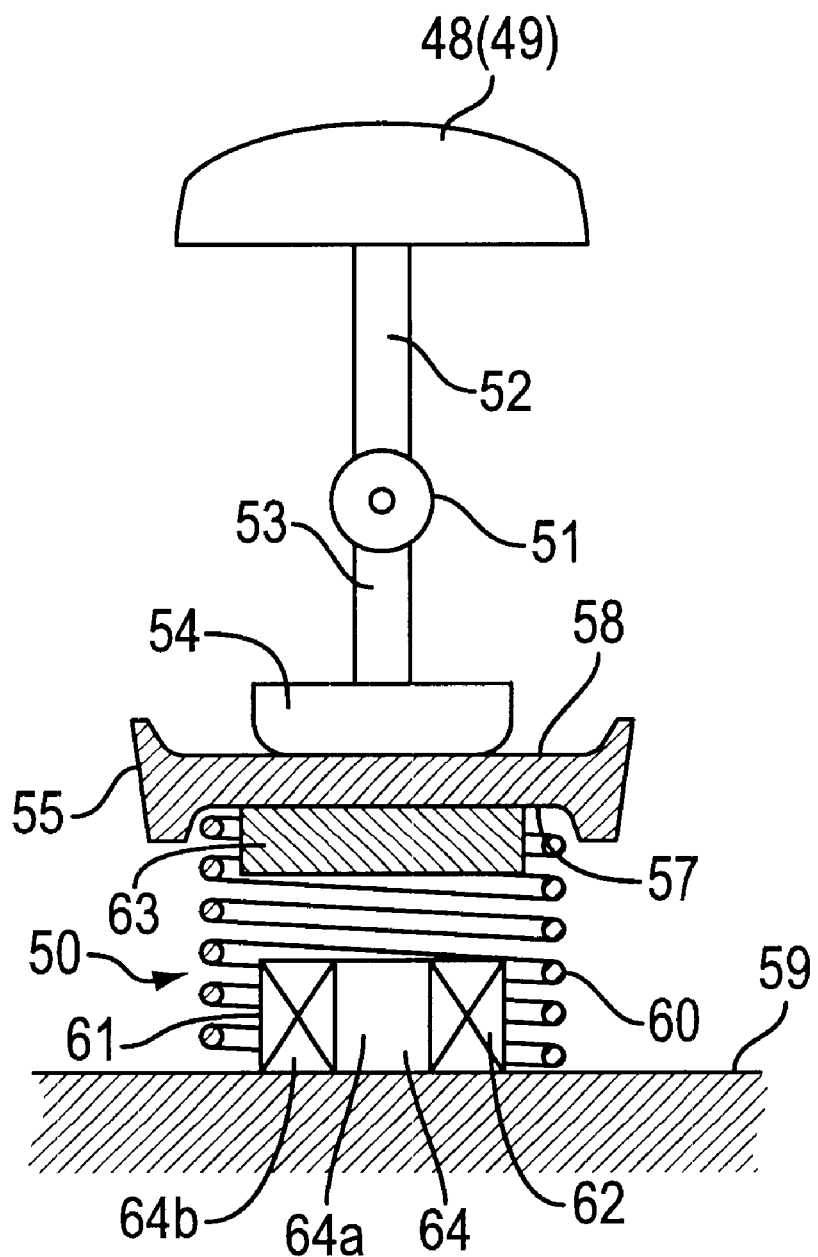
FIG. 6 is a sectional view showing the tactile-force generating apparatus.

As shown in FIGS. 5 and 6, the tactile-force generating apparatus 50 comprises a first tactile-force generating means, which will, for purposes of explanation, be described as an elastic body, or more particularly, a coil spring 60. The first tactile-force generating means corresponds to the displacement of the input section, and is provided in a section adjoining a support section 59 on the side adjacent to the housing main unit 42. A second tactile-force generating means, or a variable tactile-force generating means 61 is placed in a location inside the coil spring 60.

The coil spring 60 generates a tactile force independently of game information and imparts a tactile force corresponding to the displacement of the control pad 48 (49), or the input section, that is, the tactile force specific to the coil spring 60, to the control pad 48 (49) via the driving body receiver 55.

The variable tactile-force imparting unit 61 generates a magnetic force corresponding to the game information (content), and comprises magnetic-force generating means 62 and a permanent magnet (movable body) 63. The magnetic-force generating means 62 comprises an electromagnet 64 formed of an iron core 64a and a coil 64b, and a drive unit (supply means) 65 (to be described later). The permanent magnet 63 is mounted in such a manner as to be housed in the first recess 57 of the driving body receiver 55, and the electromagnet 64 is mounted on the support section 59.

Figure 7:
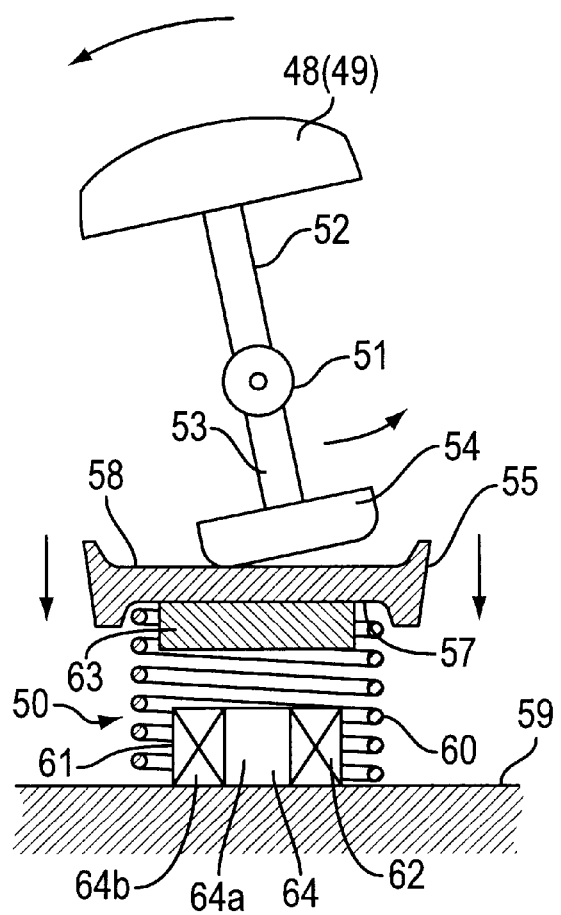
FIG. 7 is a sectional view illustrating the operation of the tactile-force generating apparatus.

As shown in FIG. 7, when the control pad 48 (49) or input section is operated or tilted, the edge of the driving body 54 is brought into abutment with the driving body receiver 55, and the driving body receiver 55 is thereby displaced toward the support section 59, causing the spring 60 to be compressed and the spacing between the permanent magnet 63 and the electromagnet 64 to be reduced. Accordingly, the first tactile-force generation unit, or spring 60, provides a repulsive force directly related to the displacement of such spring 60 from its predetermined or rest position.

Figure 8:
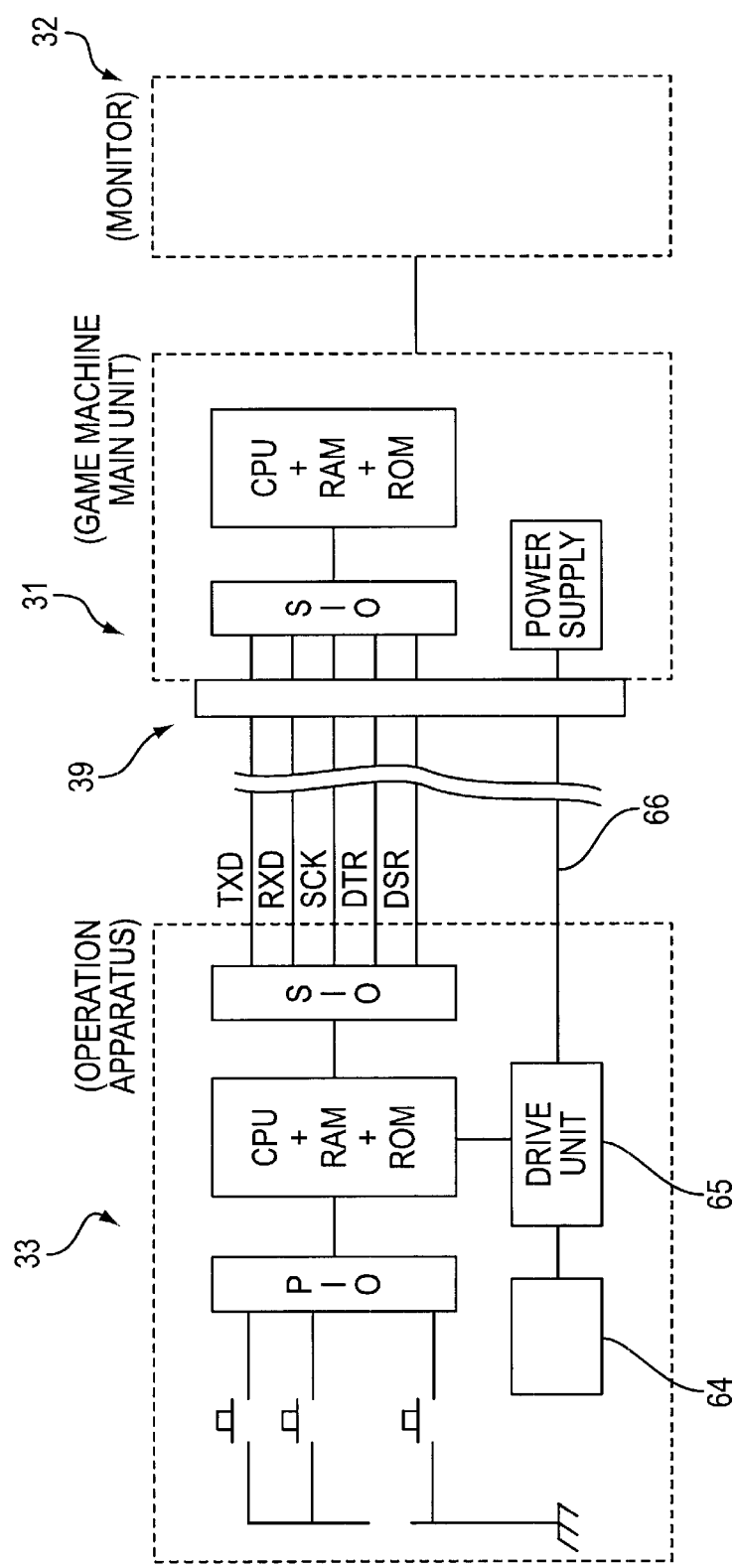
FIG. 8 is a block diagram showing a state in which the operation apparatus of the game machine and the main unit of the game machine are connected to each other.

Next, a two-way communication function is described. As shown in FIG. 8, the operation apparatus 33 for the game machine comprises an I/O interface SIO for performing serial communication with the game machine main unit 31, a parallel I/O interface PIO for inputting operation data from a plurality of operation buttons, a one-chip microcomputer comprising a CPU, a RAM, and a ROM, and a drive unit 65 for supplying electric current corresponding to game information to the electromagnet 64.

On the other hand, the game machine main unit 31 is formed so that a serial I/O interface SIO for performing serial communication with the operation apparatus 33 for the game machine is provided. When the connector 39 of the operation apparatus 33 for the game machine is connected, the game machine main unit 31 is connected to the serial I/O interface SIO on the operation apparatus 33 for the game machine side, making it possible to realize a two-way communication means, that is, to perform two-way serial communication.

A signal line and a control line for performing two-way serial communication are formed of a signal line TDX (Transmit X' for Data) for data transmission for transmitting data from the game machine main unit 31 to the operation apparatus 33 for the game machine, a signal line RXD (Received X' for Data) for data transmission for transmitting data from the operation apparatus 33 for the game machine to the game machine main unit 31, a signal line SCK (Serial Clock) for serial synchronization clock for extracting data from each of the signal lines TDX and RXD for data transmission, and a control line DTR (Data Terminal Ready) for establishing, interrupting, etc., communication with the operation apparatus 33 for the game machine, which is on the terminal side.

A cable formed of the signal line and the control line for performing two-way serial communication includes, in addition to a signal line and a control line, a power-supply cable 66 which is directly extended from the power supply on the game machine main unit 31 side. This power-supply cable 66 is connected to the drive unit 65 on the operation apparatus 33 for the game machine side and supplies power to the electromagnet 64.

In the two-way serial communication procedure structured as described above, the game machine main unit 31 communicates with the operation apparatus 33 for the game machine. In order to input operation data (button information) of the operation buttons of first to fourth operation sections 40, 41, 44, and 45, the game machine main unit 31 first confirms that selection has been made by the control line DTR, and following this, enters a state of waiting for a signal line TXD to be received. Then, the game machine main unit 31 sends an identification code indicating the operation apparatus 33 for the game machine to the signal line TXD for data transmission. In response, the operation apparatus 33 for the game machine receives this identification code from the signal line TXD.

Since the identification code indicates the operation apparatus 33 for the game machine, hereafter, communication with the game machine main unit 31 is started. That is, control data, etc., is transmitted from the game machine main unit 31 to the operation apparatus 33 for the game machine through the signal line TXD for data transmission. In contrast, operation data of the operation by the operation buttons, etc., is transmitted from the operation apparatus 33 for the game machine to the game machine main unit 31 through the signal line RXD for data transmission. In this manner, two-way serial communication is performed between the game machine main unit 31 and the operation apparatus 33 for the game machine, and is terminated when the game machine main unit 31 outputs selection stopping data through the control line DTR.

If the two-way serial communication function is provided in this manner, it is possible to transmit operation data of the operation button primarily from the operation apparatus 33 for the game machine to the game machine main unit 31, and it is possible to send tactile-force data for supplying electric current by which a magnetic force corresponding to game information is generated in the electromagnet 64, from the game machine main unit 31 to the operation apparatus 33 for the game machine through the signal line TXD for data transmission. This tactile-force data corresponding to the game information has been set in advance by a CD-ROM for a game mounted in the game machine main unit 31, and feedback by dynamic transmission for a fixed time period is performed from the game machine main unit 31 to the operation apparatus 33 itself for the game machine according to the type, content, and situation of the game, and furthermore, according to the operation target for a user who plays the game. With regard to this point, a further description is given with reference to FIGS. 9 and 10.

Figure 9:
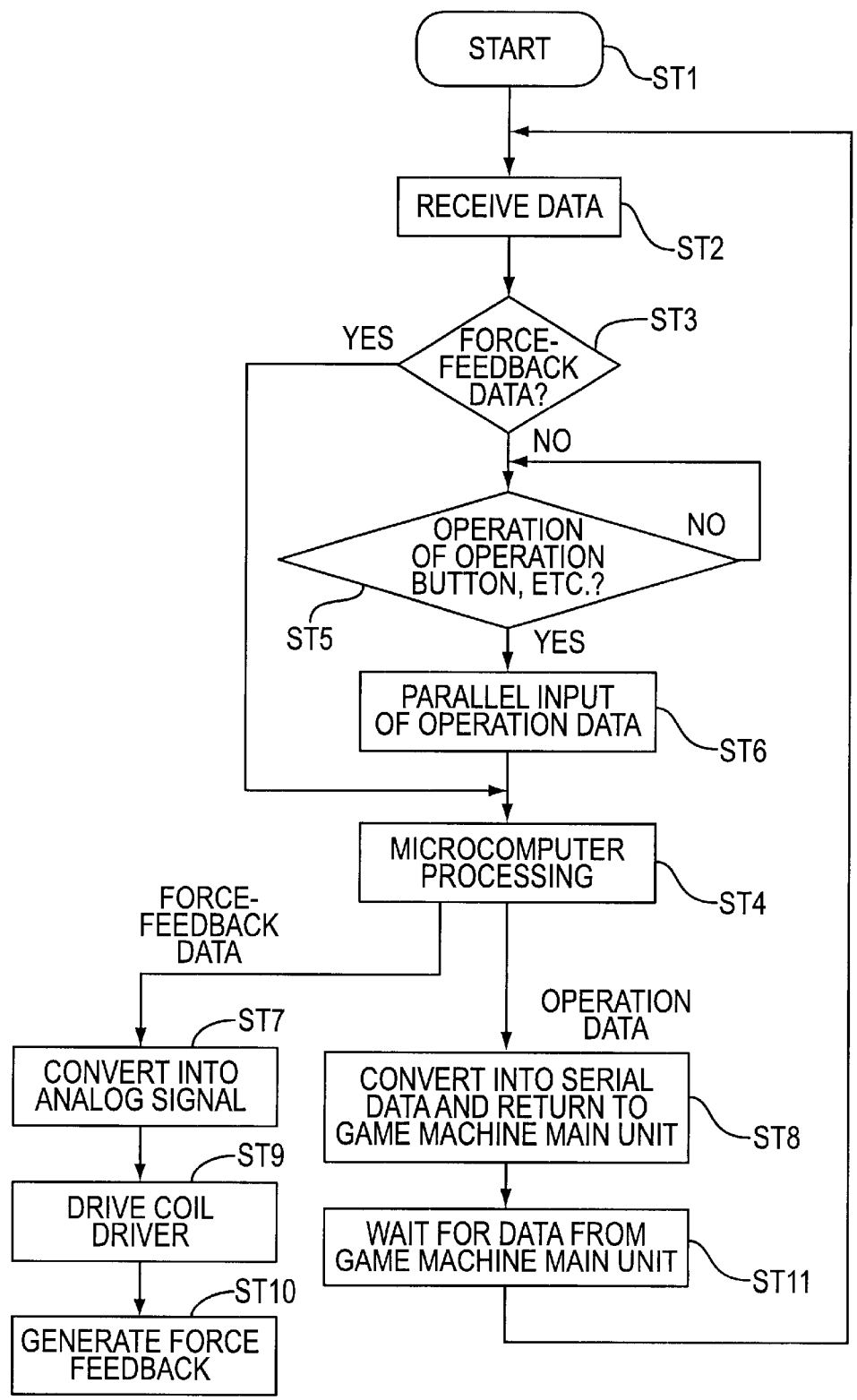
FIG. 9 is a flowchart showing a processing procedure of the operation apparatus for the game machine.

Referring to FIG. 9, the processing procedure on the operation apparatus 33 side will be described first. In step ST1, a CD-ROM for a specific game is mounted in the game machine main unit 31, and the starting of the game is set by a start switch 43a (see FIG. 4) of the operation apparatus 33 for the game machine, and by operating a select switch 43b (see FIG. 4), a state is reached in which the game is played, and the process proceeds to step ST2.

In step ST2, with the starting of the game, the microcomputer comprising a CPU, a RAM, and a ROM of the operation apparatus 33 for the game machine continuously monitors whether tactile-force data is sent from the game machine main unit 31 via the serial I/O interface SIO. This tactile-force data contains data for driving the electromagnet 64 according to the game information. Then, the process proceeds to step ST3.

In step ST3, a determination is made as to the tactile-force data within the data signal received by the operation apparatus 33 for the game machine. If there is tactile-force data, the process proceeds to step ST4, and if there is no tactile-force data, the process proceeds to step ST5.

In step ST5, a check is made to determine whether or not the operation button, etc., has been operated. If the operation button has been operated, the process proceeds to step ST6, and if the operation button has not been operated, the process enters a waiting state and continues to monitor whether or not the operation button has been operated.

In step ST6, the operation data is output via the parallel I/O interface PIO, and the process proceeds to step ST4.

In step ST4, the tactile-force data is processed by the microcomputer, and the process proceeds to step ST7. In addition, the operation data from the parallel I/O interface PIO is processed, and the process proceeds to step ST8.

In step ST7, the tactile-force data is converted into an analog signal, and the process proceeds to step ST9.

In step ST9, the drive unit 65 is driven by the analog signal, electric current corresponding to the game information is output from the drive unit 65, and the process proceeds to step ST10.

In step ST10, the electromagnet generates a magnetic force by the electric current supplied from the drive unit 65, thereby imparting a tactile force to the control pad 48 (49) or input section. That is, the tactile force corresponding to the game information, generated by the electromagnet 64, is superposed onto the specific tactile-force by the spring 60. In this case, the magnitude of the tactile-force added to the control pad 48 (49) varies in accordance with the magnitude of the electric current supplied to the electromagnet 64. If electric current is made to flow so that the electromagnet 64 and the permanent magnet 63 repel each other, the tactile force of the control pad 48 (49) reaches a magnitude such that the tactile force by the spring 60 and the tactile force by the electromagnet 64 are added together. Thus, the tactile sensation felt at the input section is the addition of the first and second tactile-force generation units. If electric current is made to flow so that the electromagnet 64 and the electromagnet 64 attract each other, the tactile force of the control pad 48 (49) reaches a magnitude such that the tactile force by the electromagnet 64 is subtracted from the tactile force by the spring 60. Thus, the tactile sensation felt at the input section is the subtraction of the first and second tactile-force generation units.

By way of a simple example, the operation and interaction of the first and second tactile force generation units might be described as follows. Assuming the game information relates to a driving game, and the control pad or input section relates to the steering wheel of the car. It takes a small amount of effort to operate the steering wheel when the car is moving, a medium amount of effort to operate the steering wheel when the car is stopped, and a large amount of effort to operate the steering wheel when the car is crashing into a wall or the like. Accordingly, when the car is at rest, the tactile sensation experienced at the input section might be governed solely by the first tactile-force generation means, or the spring alone, and the medium amount of effort required to move the input section will be equal to the repulsion force of the 5 spring. When the car is moving, the tactile sensation experienced at the input section might be equal to the first tactile-force generation means less the second tactile-force generating means, or the repulsion force of the spring reduced by the attraction of the energized electromagnet and the permanent magnet. Thus, the input section will be easier to operate, i.e., it will be easier to position the input section away from its predetermined position. Finally, when the car is crashing into a wall or the like, the tactile sensation experienced at the input section might be equal to the first tactile-force generation means plus the second tactile-force generating means, or the repulsion force of the spring enhanced by the repulsion of the energized electromagnet and the permanent magnet. Thus, the input section will be more difficult to operate, i.e., it will be harder to position the input section away from its predetermined position. The activation of the second tactile-force generation means corresponds to game information, i.e., if the car is moving or crashing into a wall, while the first tactile-force generation means is independent of game information, i.e., when the car is at rest and the input section is under the influence of the spring alone. Thus, the tactile sensation fed back from the game machine can be obtained from the input section itself so as to improve the verisimilitude of the game, and improve the playing effects thereby. Also, the variety of sensations felt at the input section is greatly enhanced as a result of the interaction between the first and second tactile-force generating means. In step ST8, the operation data is converted into serial data, this is returned to the game machine main unit 31 via the serial I/O interface SIO, and the process proceeds to step ST11.

In step ST11, the receipt of the data from the game machine main unit 31 is awaited, and the process returns to step ST2.

Figure 10:
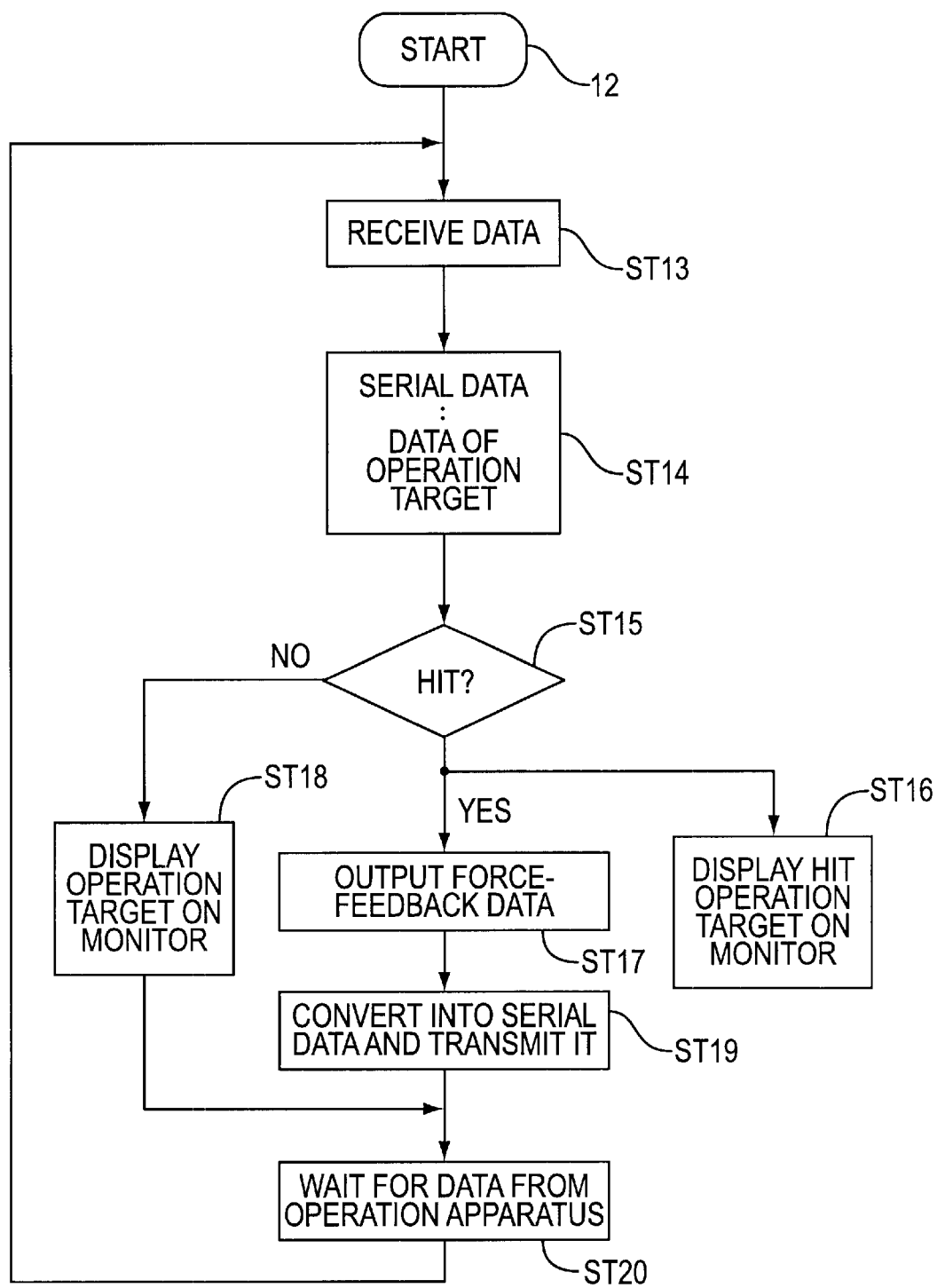
FIG. 10 is a flowchart showing a processing procedure of the main unit of the game machine.

Next, referring to FIG. 10, the processing procedure on the game machine main unit 31 side is described. Initially, in step ST12, a state is reached in which the game is played at the same time as in step ST1, and the process proceeds to step ST13.

In step ST13, serial data is received from the operation apparatus 33 for the game machine, and the process proceeds to step ST14.

In step ST14, serial data is input so that the data of the operation target can be compared with the received serial data, and the process proceeds to step ST15.

In step ST15, a determination is made as to the hit state by comparing the data of the operation target with the received serial data. When the data of the operation target coincides with the received serial data, that is, it indicates a "hit", the process proceeds to steps ST16 and ST17. If they do not coincide with each other, the process proceeds to step ST18.

In step ST16, the hit operation target is displayed on the monitor screen.

In step ST17, the tactile-force data is output, and the process proceeds to step ST19.

In step ST19, the tactile-force data is converted into serial data, and is returned as a specific response signal to the operation apparatus 33 for the game machine via the serial I/O interface SIO, and the process proceeds to step ST20.

In step ST18, after the CPU (Central Processing Unit) of the game machine main unit 31 displays the operation target based on the operation button on the screen of the monitor, the process proceeds to step ST20.

In step ST20, the receipt of data from the operation apparatus 33 for the game machine is awaited, and the process returns to step ST13.

According to the above construction, since the spring 60 for generating a tactile force independently of game information is provided in the control pad 48 (49) or input section and the magnetic-force generation means 62 for generating a tactile force corresponding to game information is provided in the control pad 48 (49), a tactile force corresponding to the game information (content) is directly imparted to the control pad 48 (49), and the number of parts can be reduced, and sufficient direct tactile sensation transmitted to the finger tip can be provided.

The variable tactile-force imparting means (second tactile-force generation means) 61 may impart a tactile force to the control pads 48 and 49 on the basis of or corresponding to separate game information.

Although the construction is formed in such a way that the tactile-force data is received by the operation apparatus 33 for the game machine as a specific response signal from the game machine main unit 31, the construction may also be formed in such a way that the tactile-force data is sent out by one-way communication from the game machine main unit 31 to the operation apparatus 33 for the game machine.

Figure 11:
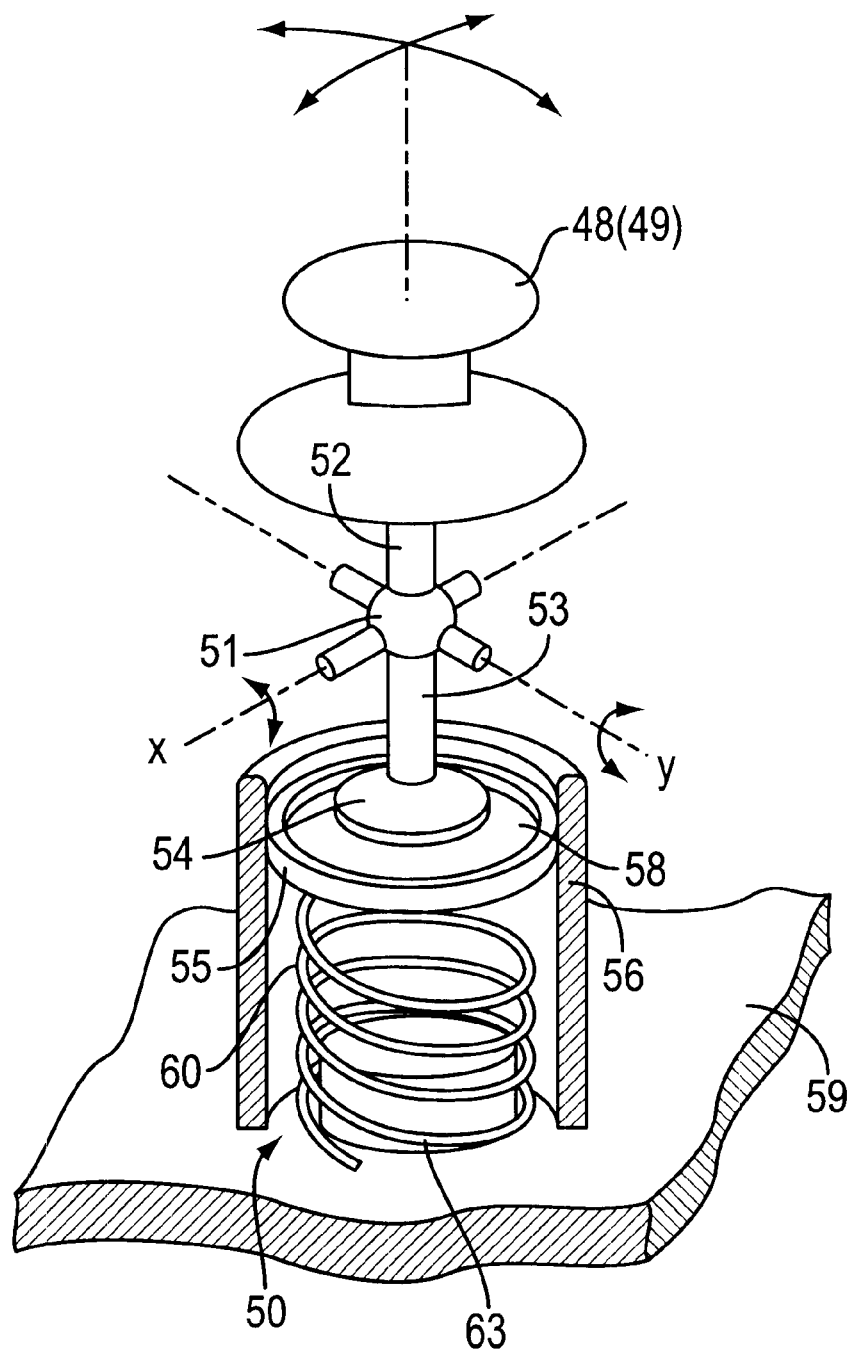
FIG. 11 is a perspective view showing another embodiment of a tactile-force generating apparatus for the control pad.
Figure 12:
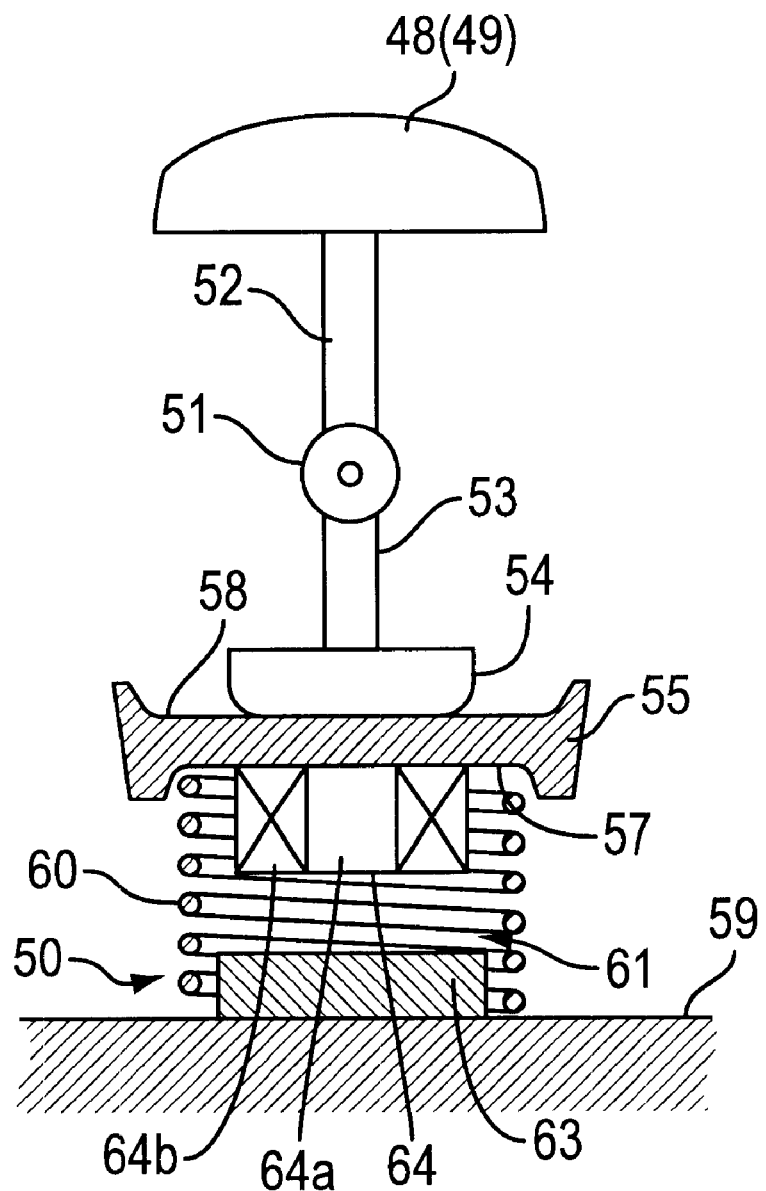
FIG. 12 is a sectional view showing the tactile-force generating apparatus.
Figure 13:
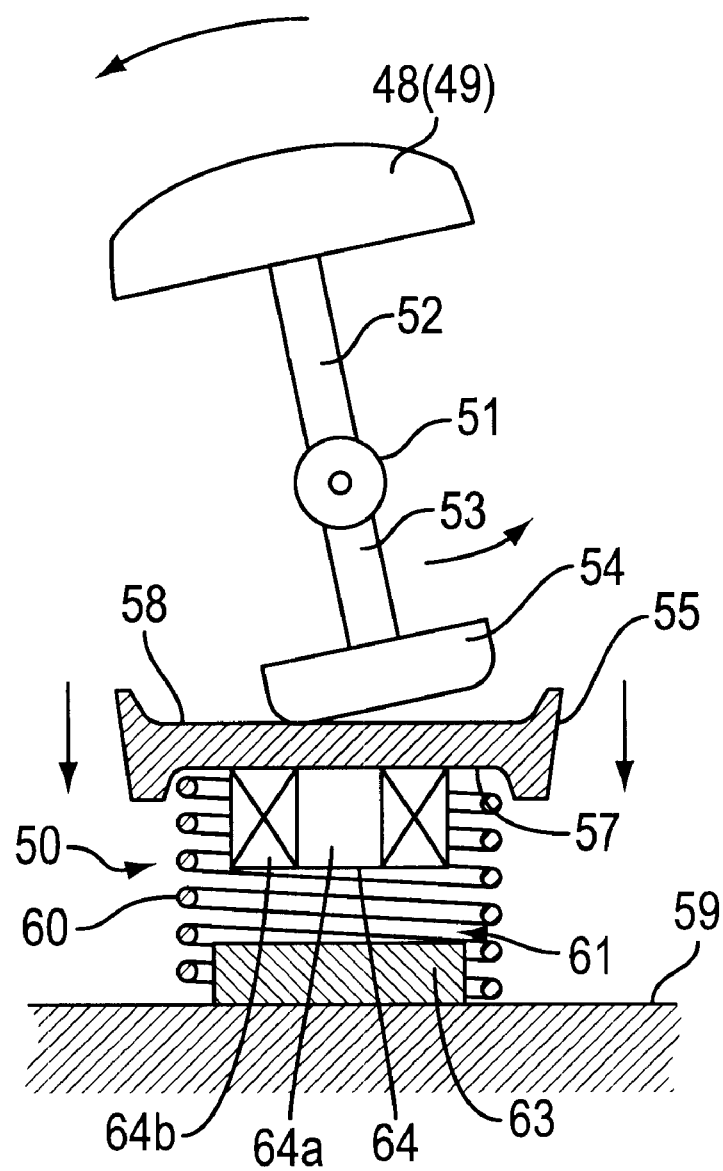
FIG. 13 is a sectional view illustrating the operation of the tactile-force generating apparatus.

In the above-described first embodiment, as shown in FIGS. 5 to 7, the variable tactile-force imparting means (second tactile-force generation means) 61 is mounted in such a way that the permanent magnet 63 is housed in the first recess 57 of the driving body receiver 55 and that the electromagnet 64 is mounted in the support section 59. However, the present invention is not limited to this example, and as shown in FIGS. 11 to 13, the electromagnet 64 may be mounted in such a manner as to be housed in the first recess 57 of the driving body receiver 55, and the permanent magnet 63 may be mounted in the support section 59. Thus, the location of the magnetic force generating means 64 and the movable body or permanent magnet 63 may vary, so long as the magnetic force generating means 64 can influence the permanent magnet 63 and with it the input section.

Next, a second, alternative embodiment of the present invention will be described with reference to FIGS. 14 and 15.

Figure 14:
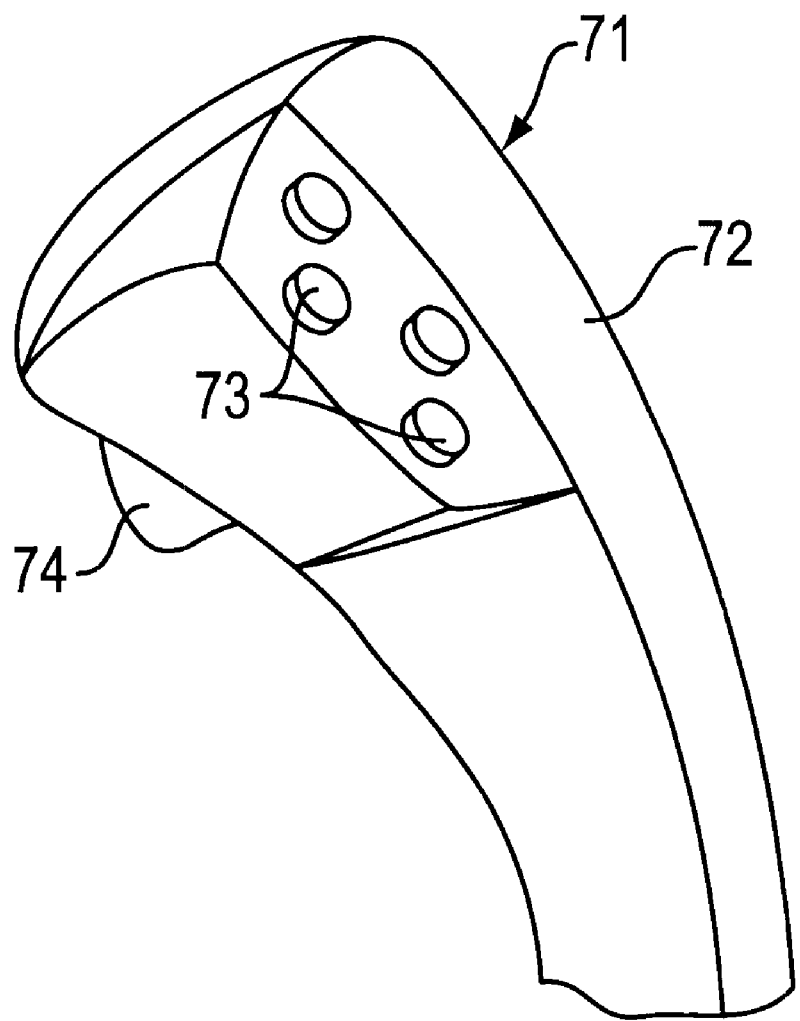
FIG. 14 is a perspective view showing an operation apparatus of a game machine according to a second embodiment of the present invention.

Referring to FIG. 14, reference numeral 71 denotes an operation apparatus for a game machine, which is capable of performing a predetermined operation as a result of the entire body thereof being tilted in x and y directions. The operation apparatus 71 for a game machine is connected to a game machine main unit (not shown), a monitor, such as a television receiver, etc.

This operation apparatus 71 comprises a housing 72 preferably formed nearly in the shape of a stick so that the operation apparatus 71 can be gripped by one hand and operated. On the rear surface side (the frontward side) of this housing 72, buttons 73 as input sections are provided, and on the front (on the other side), a trigger 74 as an input section is provided.

Figure 15:
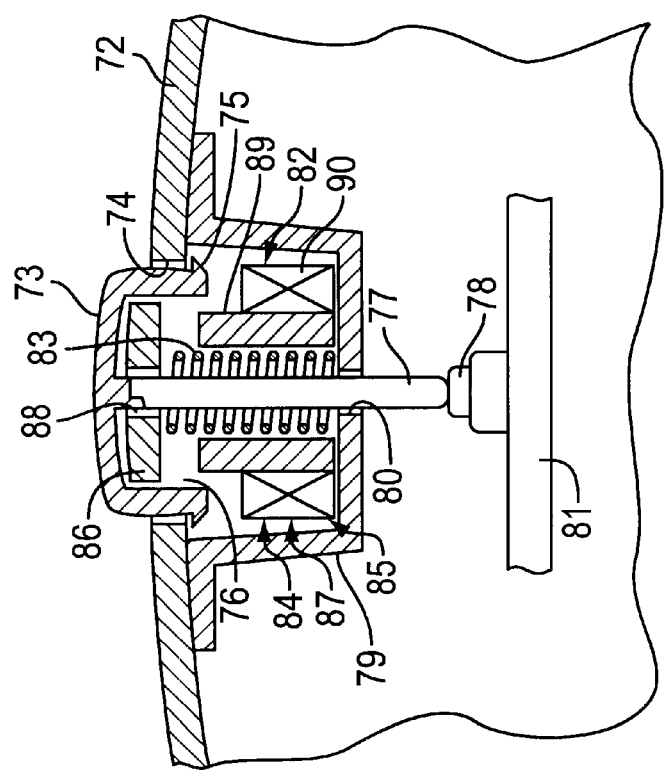
FIG. 15 is a sectional view showing another embodiment of a tactile-force generating apparatus for a button of the operation apparatus.

As shown in FIG. 15, each button 73 is provided in a hole 74 formed in the housing 72 in such a manner as to freely project therefrom or retract thereinto. A flange-shaped stopper 75 is formed in the inner portion of the button 73 side the housing 72 so that the button 73 is prevented from escaping outside the housing 72. Also, on the rear surface side of the button 73, a recess-shaped housing section 76 is formed, and a rod 77 is extendedly provided from the center of the housing section 76. Then, when the button 73 is depressed, the tip of the rod 77 pushes a switch 78 on a board 81, thereby generating an input signal.

Also, a frame body 79 is provided between the button 73 and the switch 78. This frame body 70 is mounted in the inner surface of the housing 72 in such a manner as to surround the rear surface side of the button 73. This frame body 79 is formed with an insertion hole 80 for the rod 77.

A tactile-force generating apparatus 82 for imparting a tactile-force to the button 73 is provided between the frame body 79 and the button 73.

This tactile-force generating apparatus 82 comprises a first tactile force generating means, which will, for purposes of explanation, be described as an elastic body, or more particularly, a coil spring 83, which corresponds to the displacement of the input section, and a second, or variable tactile-force generating means 84.

The coil spring 83 is externally fitted to the rod 77 between the button 73 and the frame body 79, and urges the button 73 in the direction in which it projects from the housing 72. That is, the coil spring 83 generates a tactile-force independently of game information, and imparts a tactile force corresponding to the depressed displacement of the button 73, that is, a tactile force which is specific to the coil spring 83.

The variable tactile-force generating means 84 comprises magnetic-force generating means 85 and a permanent magnet (movable body) 86. The magnetic-force generating means 85 comprises an electromagnet 87 and a drive unit (supply means) (not shown).

The permanent magnet 86 is preferably formed in the shape of a circular disk, with an insertion hole 88 for the rod 77 being formed in its center. The permanent magnet 86 is preferably housed in the housing section 76 of the button 73 in a state in which the rod 77 is inserted thereinto and in a state of receiving one end of the spring 83.

The electromagnet 87 generates a magnetic force corresponding to game information (contents). The electromagnet 87 comprises a cylindrical iron core 89 which is externally fitted to the coil spring 83 and a coil 90 which is placed outside the iron core 89, with the iron core 89 and the coil 90 being mounted in such a manner as to be housed in the frame body 79. That is, the coil spring 83, the permanent magnet 86, the iron core 89, and the coil 90 are arranged coaxially, with the rod 77 representing the axis.

When the button 73 is pushed down, the spacing between the permanent magnet 86 and the electromagnet 87 is reduced with the compression of the spring 83.

When the drive unit is driven in accordance with the game information and electric current corresponding to the game information is output from the drive unit, the electromagnet 87 generates a magnetic force which is felt by the permanent magnet 86, thereby imparting a tactile force to the button 73. That is, the tactile force corresponding to the game information generated by the electromagnet 87 is superposed onto the specific tactile force by the spring 83. In this case, the magnitude of the tactile force added to the button 73 varies by the magnitude of the electric current supplied to the electromagnet 87. If electric current is made to flow so that the electromagnet 87 and the permanent magnet 86 repel each other, the tactile force of the button 73 reaches a magnitude such that the tactile force by the coil spring 83 and the tactile force by the electromagnet 87 are added together. If electric current is made to flow so that the electromagnet 87 and the permanent magnet 86 attract each other, the tactile force of the button 73 reaches a magnitude such that the tactile force by the electromagnet 87 is subtracted from the tactile force by the spring 83.

Figure 16:
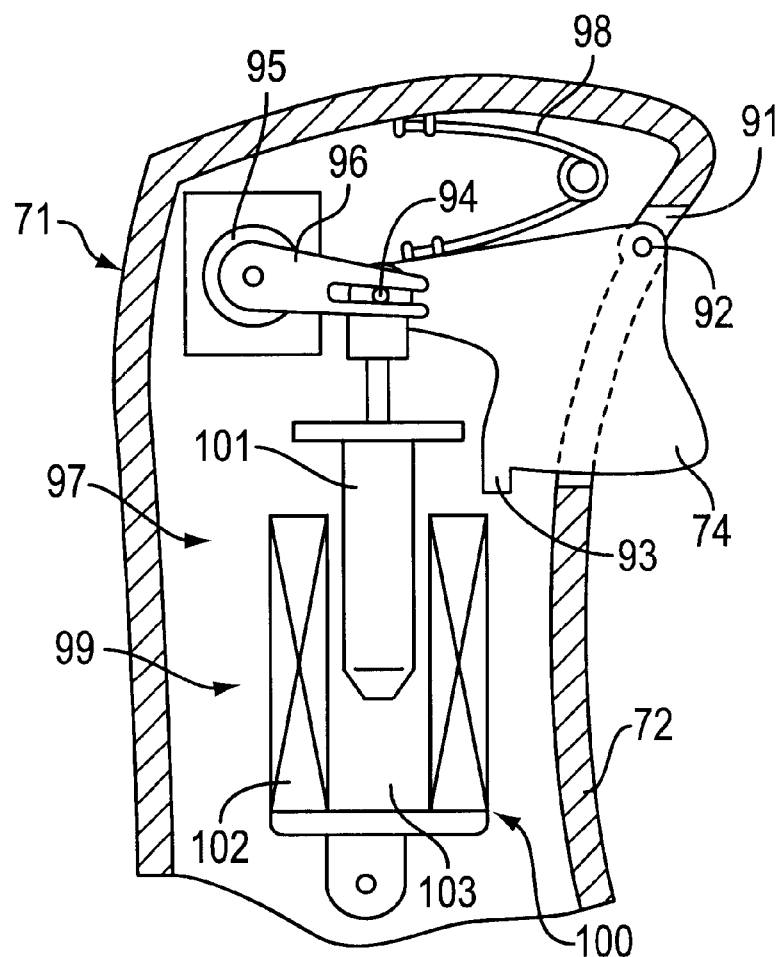
FIG. 16 is a perspective view showing another embodiment of a tactile-force generating apparatus for a trigger of the operation apparatus.

As shown in FIG. 16, the trigger 74 is capable of projecting from or retracting into a hole 91 formed in the housing 72. That is, the trigger 74 is mounted in the housing 72 in such a manner as to be rotationally movable via a rotationally moving shaft 92 so that the trigger 74 can project from or retract into the hole 91 with the rotational movement. A stopper 93 which is capable of abutting the housing 72 is formed in an inner portion of the trigger 74 inside the housing 72 and at the rotational movement end so that the trigger 74 is prevented from escaping outside the housing 72.

Furthermore, a joint shaft 94 is mounted in an inner portion of the trigger 74 inside the housing 72, and the tip of an arm 96 mounted in a volume 95 is locked to the joint shaft 94. When the trigger 74 is rotationally moved with the rotationally moving shaft 92 being a fulcrum, the arm 96 of the volume 95 rotates, generating an input signal.

Furthermore, a tactile-force generating apparatus 97 for imparting a tactile force to the trigger 74 is provided inside the housing 72. This tactile-force generating apparatus 97 comprises a first tactile-force generating means, which will, for purposes of explanation, be described as a forked spring 98, which corresponds to the displacement of the input section or the trigger 74, and a second, or variable tactile-force generation means 99.

The spring 98 is interposed between the trigger 74 and the housing 72 so that the spring 98 urges the trigger 74 in the direction in which it projects from the housing 72. That is, the spring 98 generates a tactile force independently of game information, and imparts a tactile force corresponding to the depressed displacement of the trigger 74, that is, a tactile force which is specific to the spring 98, to the trigger 74.

The variable tactile-force imparting means 99 comprises magnetic-force generating means 100 and an iron core (magnetic body (movable body)) 101. The magnetic-force generating means 100 comprises a coil 102 and a drive unit (supply means) (not shown).

The iron core 101 is engaged at one end with the joint shaft 94 of the trigger 74, and reciprocates with the rotational movement of the trigger 74.

The coil 102 generates a magnetic force corresponding to game information (contents), and is formed in a cylindrical shape having a hole 103 through which the iron core 101 advances or retreats, and is fixed to the housing 72.

When the trigger 74 is depressed, the spring 98 is compressed, and the iron core 101 moves in the direction in which it exits from the hole 103 of the coil 102.

When the drive unit is driven by the game information and electric current corresponding to the game information is output from the drive unit, a magnetic force is generated in the coil 102 in order to generate a force which attracts the iron core 101. As a result, the iron core 101 moves in the direction in which it enters deeply into the hole 103 of the coil 102, imparting a tactile force to the trigger 74. That is, the tactile force corresponding to the game information generated by the coil 102 is superposed onto the specific tactile force by the spring 98. In this case, the magnitude of the tactile force added to the trigger 74 varies by the magnitude of the electric current supplied to the coil 102.

Figure 17:
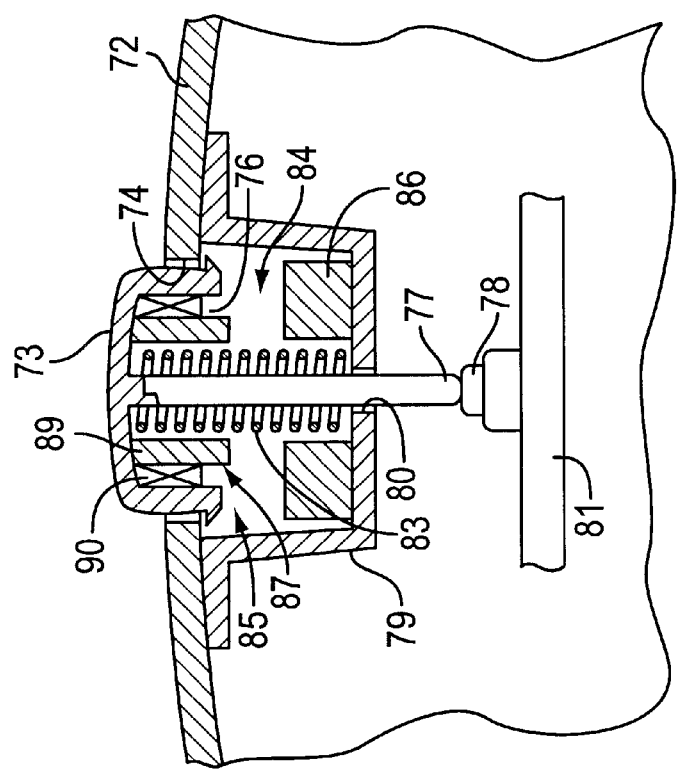
FIG. 17 is a sectional view showing another embodiment of a tactile-force generating apparatus for a button of the operation apparatus.

In the above-described second embodiment, as shown in FIG. 15, for the variable tactile-force generation means (second tactile-force generating means) 84 for the button 73, the permanent magnet 86 is mounted in the button 73, and the electromagnet 87 is mounted in the frame body 79. However, the present invention is not limited to this example, and as shown in FIG. 17, the electromagnet 87 may alternatively be mounted in the button 73 and the permanent magnet 86 may be mounted in the frame body 79.

Figure 18:
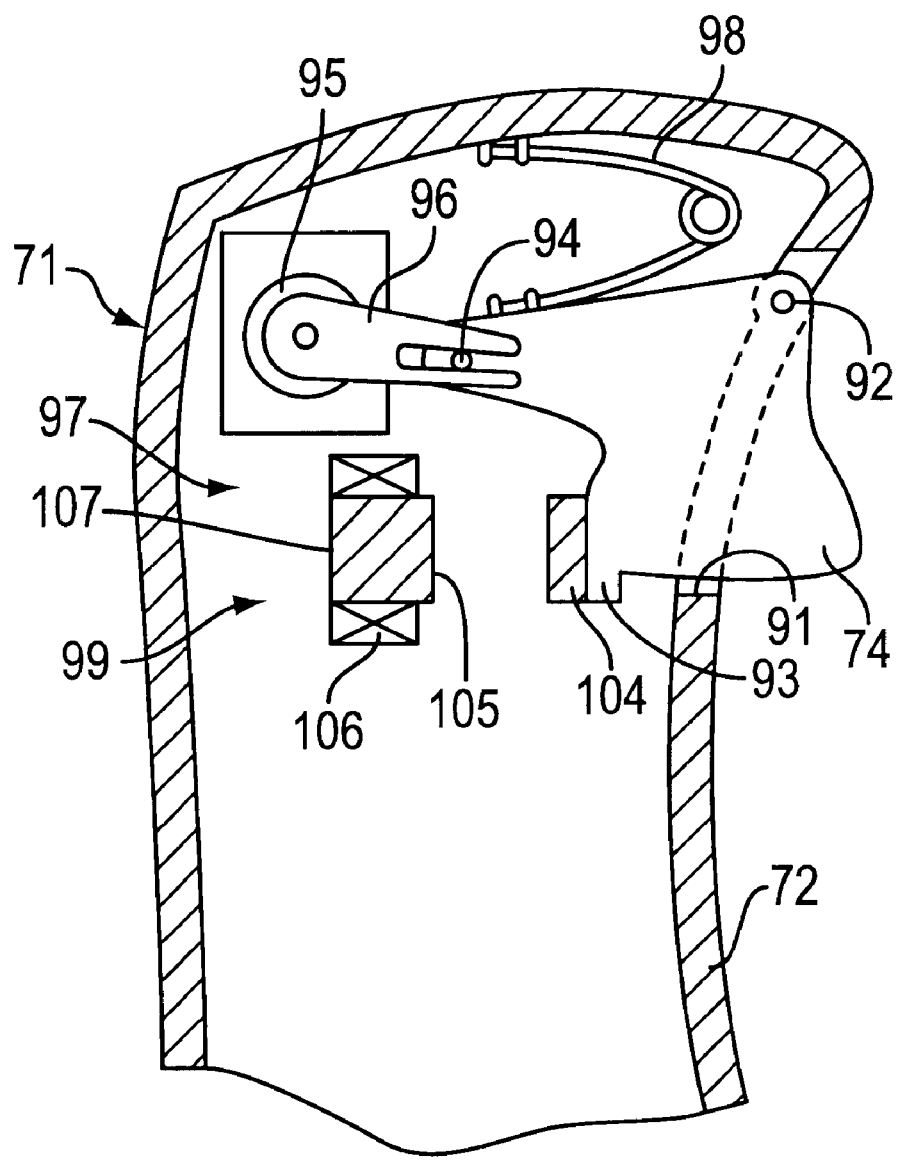
FIG. 18 is a perspective view showing another embodiment of a tactile-force generating apparatus for a trigger of the operation apparatus.

Furthermore, in the above-described second embodiment, as shown in FIG. 16, for the variable tactile-force generation means 99 (second tactile-force generating means) for the trigger 74, the iron core 101 is mounted on the side adjacent to the trigger 74, and the coil 102 is mounted in the housing 72. However, the present invention is not limited to this example, and as shown in FIG. 18, a permanent magnet 104 may alternatively be mounted in the trigger 74, and an electromagnet 107 formed of an iron core 105 and a coil 106 may be mounted on the side adjacent to the housing 72. Furthermore, although not shown, the electromagnet 107 may be mounted in the trigger 74, and the permanent magnet 104 may be mounted in the housing 72.

Figure 19:
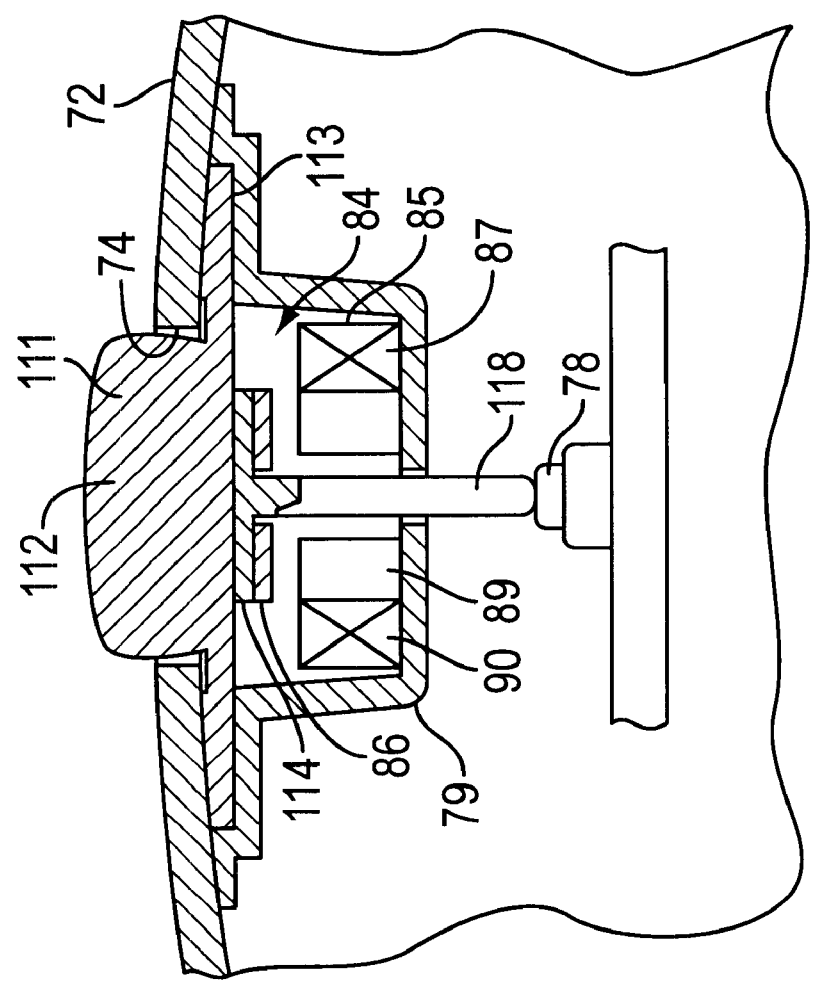
FIG. 19 is a sectional view showing another embodiment of a tactile-force generating apparatus for a button of the operation apparatus.

Furthermore, in the above-described second alternative embodiment shown in FIG. 15, a coil spring 83 is used for the elastic body. However, the present invention is not limited to this example, and as shown in FIG. 19, the elastic body may alternatively be a rubber-like member. That is, in this embodiment, the entirety of a button 111 (input section) is formed of a rubber-like member. The button 111 integrally has a button main unit 112 which is provided in such a manner as to project from or retract into the hole 74, and a flange section 113 which is provided in an inner portion of the button main unit 112 inside the housing 72, with the outer peripheral edge portion of the flange section 113 being mounted in the housing 72. The elasticity of the inner peripheral portion of the flange section 113, that is, on the side adjacent to the button main unit 112, causes the button 111 to be urged in the direction in which it projects from the housing 72. That is, the rubber-like member generates a tactile force independently of game information, and imparts a tactile force which corresponds to the depressed displacement of the button 111, that is, a tactile force which is specific to the rubber-like material, to the button main unit 112.

Forming the button 111 out of a rubber-like material is desirable, since it replaces the use of a spring body or the like. It will be understood, for example, that the rod 77 of FIG. 17 may also be made from a rubber-like material, in which case the spring 83 would not be required, and the rubber-like rod would then form the elastic body or the first tactile-force generating means.

A rod 118 is mounted in the button main unit 112. That is, the rod 118 has a flange section 114 at the base end portion, and the flange section 114 is mounted in the bottom of the button main unit 112. Furthermore, the permanent magnet 86 is mounted in the flange section 114.

Figure 20:
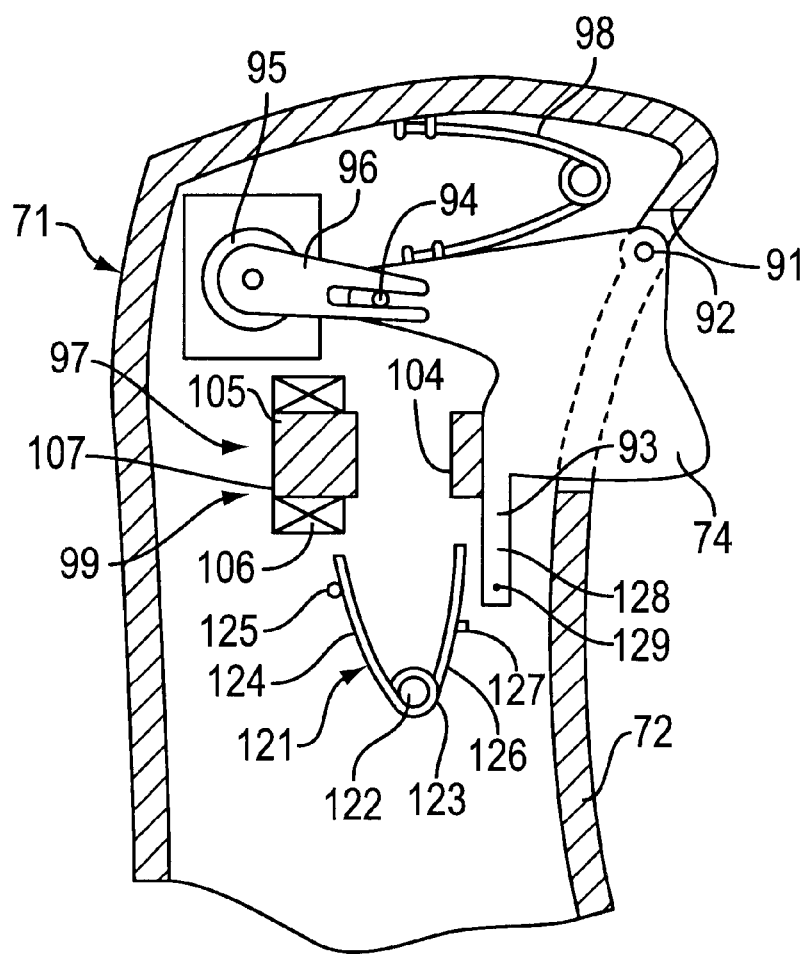
FIG. 20 is a perspective view showing another embodiment of a tactile-force generating apparatus for a trigger of the operation apparatus.

In the above-described second embodiment, as shown in FIGS. 16 and 18, as an elastic body (tactile-force-corresponding-to-displacement imparting means (specific tactile-force imparting means (first tactile-force generating means))) for the trigger 74, only a single forked spring (first elastic body (tactile-force-corresponding-to-displacement imparting means (specific tactile-force imparting means (first tactile-force generating means)))) 98 is used. However, the present invention is not limited to such a representation, and as shown in FIG. 20, another spring (second elastic body (tactile-force-corresponding-to-displacement imparting means (specific tactile-force imparting means (first tactile-force generating means)))) 121 may be provided.

More specifically, a support shaft 122 is provided in the housing 72, and the base end portion of the forked spring 121 is supported in the support shaft 122. A first end portion 124 of the forked spring 121 is locked to a first lock shaft 125 provided in the housing 72, and a second end portion 126 is locked to a second lock shaft 127 provided in the housing 72. Additionally, a stopper 93 of the trigger 74 is extendedly formed, and a lock shaft 129 is mounted in the extension section 128.

When the amount of depression of the trigger 74 exceeds a predetermined amount, the lock shaft 129 locks to the second end portion 126 of the spring 121 so as to receive a tactile force of the spring 121. That is, the spring 98 imparts a tactile force to the trigger 74 over the entire displacement (first displacement) of the trigger 74, and the spring 121 imparts a tactile force to the trigger 74 in the latter-half of displacement (second displacement) of the trigger 74. As a result, the construction is formed in such a way that in the former-half displacement of the trigger 74, the tactile force of the spring 98 is imparted, and in the latter-half displacement of the trigger 74, the tactile forces of the spring 98 and the spring 121 are imparted.

As has been described up to this point, according to the present invention, excellent advantages can be exhibited, such as the number of parts being reduced and sufficient direct tactile sensation transmitted to the finger tip being provided.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A tactile-force generating apparatus for generating in an input section which can be displaced from a predetermined position of input means for inputting information to a machine unit an input section tactile force for affecting the position of said input section, said tactile-force generating apparatus comprising:
   first tactile-force generating means for generating in said input section a first tactile force independently of game information; and
   second tactile-force generating means for generating in said input section a second tactile force corresponding to game information;
   wherein said first and second tactile-force generating means are arranged coaxially along a single axis.

2. A tactile-force generating apparatus according to claim 1, wherein said second tactile-force generating means comprises magnetic-force generating means for generating a magnetic force corresponding to game information, and a movable body which experiences a force generated by the magnetic-force generating means.

3. A tactile-force generating apparatus according to claim 2, wherein said magnetic-force generating means comprises an electromagnet and current supply means for supplying electric current corresponding to game information to the electromagnet.

4. A tactile-force generating apparatus according to claim 2, wherein said movable body is a magnetic body.

5. A tactile-force generating apparatus according to claim 2, wherein said magnetic-force generating means is closer to said input section than said movable body.

6. A tactile-force generating apparatus according to claim 2, wherein said magnetic-force generating means is provided farther from said input section than said movable body.

7. A tactile-force generating apparatus according to claim 2, wherein said input section receives one of said magnetic-force generating means or said movable body.

8. A tactile-force generating apparatus according to claim 1, wherein said input section tactile force comprises the addition of the first and second tactile-force generating means.

9. A tactile-force generating apparatus according to claim 1, wherein said input section tactile force comprises the subtraction of the first and second tactile-force generating means.

10. A tactile-force generating apparatus according to claim 1, wherein said first tactile-force generating means imparts a first tactile force corresponding to the displacement of said input section.

11. A tactile-force generating apparatus according to claim 1, wherein said first tactile-force generating means is an elastic body.

12. A tactile-force generating apparatus according to claim 11, wherein said elastic body is a spring.

13. A tactile-force generating apparatus according to claim 12, wherein said elastic body is made from rubber.

14. A tactile-force generating apparatus according to claim 1, wherein said first tactile-force generating means is the same as said input section.

15. A tactile-force generating apparatus according to claim 1, wherein said first tactile-force generating means comprises a first elastic body for generating a tactile force at a first displacement of said input section and a second elastic body for generating a tactile force at a second displacement of said input section.

16. A tactile-force generating apparatus in accordance with claim 1, wherein said first tactile-force generating means further comprises a first motorial moment and said second tactile-force generating means further comprises a second motorial moment; and wherein each of said first and second motorial moments heads in the same direction so as not to lose the tactile-force from the second tactile-force generating means to the first tactile-force generating means.

17. A tactile-force generating apparatus for generating in an input section which can be displaced from a predetermined position of input means for inputting information to a machine unit an input section tactile force for affecting the position of said input section, said tactile-force generating apparatus comprising:

an elastic body for generating in said input section a first tactile force independently of game information; and a magnetic body for generating in said input section a second tactile force corresponding to game information, said magnetic body being acted upon by a magnetic force generating unit that affects the position of said magnetic body with respect to said input section; and wherein said elastic body and said magnetic body are arranged coaxially along a single axis.

18. A tactile-force generating apparatus according to claim 17, wherein said magnetic force generating unit comprises an electromagnet and a current supply, said current supply for providing electric current corresponding to game information to said electromagnet.

19. A tactile-force generating apparatus according to claim 17, wherein said input section tactile force comprises the addition of the first and second tactile-force generating means.

20. A tactile-force generating apparatus according to claim 17, wherein said input section tactile force comprises the subtraction of the first and second tactile forces.

21. A tactile-force generating apparatus according to claim 17, wherein said elastic body is the same as said input section.

22. A tactile-force generating apparatus for generating in an input section which can be displaced from a predetermined position of input means for inputting information to a machine unit an input section tactile force for affecting the position of said input section, said tactile-force generating apparatus comprising:

first tactile-force generating means for generating in said input section a first tactile force independently of game information, said first tactile-force generating means further comprising a first motorial moment; and second tactile-force generating means for generating in said input section a second tactile force corresponding to game information, said second tactile-force generating means further comprising a second motorial moment;

wherein said first and second tactile-force generating means are arranged coaxially and each of said first and second motorial moments heads in the same direction.

* * * * *